(12) United States Patent
Nagai et al.

(10) Patent No.: US 9,548,644 B2
(45) Date of Patent: Jan. 17, 2017

(54) METHOD OF RESIN SEALING PERMANENT MAGNET AND LAMINATED CORE MANUFACTURED THEREOF

(75) Inventors: Akira Nagai, Fukuoka (JP); Go Kato, Fukuoka (JP); Yoshitada Yamagishi, Fukuoka (JP)

(73) Assignees: MITSUI HIGH-TEC, INC., Kitakyushu-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 508 days.

(21) Appl. No.: 13/813,483

(22) PCT Filed: Jun. 23, 2011

(86) PCT No.: PCT/JP2011/064460
§ 371 (c)(1),
(2), (4) Date: Jan. 31, 2013

(87) PCT Pub. No.: WO2012/023343
PCT Pub. Date: Feb. 23, 2012

(65) Prior Publication Data
US 2013/0127282 A1    May 23, 2013

(30) Foreign Application Priority Data
Aug. 20, 2010    (JP) .................................. 2010-185408

(51) Int. Cl.
*H02K 15/03*    (2006.01)
*H02K 21/14*    (2006.01)
(Continued)

(52) U.S. Cl.
CPC .............. *H02K 15/03* (2013.01); *H02K 15/12* (2013.01); *H02K 1/27* (2013.01); *H02K 1/2766* (2013.01); *Y10T 29/49012* (2015.01)

(58) Field of Classification Search
CPC ........ H02K 15/03; H02K 15/12; H02K 21/12; H02K 21/14; H02K 21/26; H02K 21/28; H01F 7/0221; F16D 27/00; Y10T 29/49075; Y10T 29/49012
(Continued)

(56) References Cited

U.S. PATENT DOCUMENTS 3,979,821 A * 9/1976 Noodleman ......... H02K 13/006
                                                        148/108
4,011,120 A * 3/1977 Aggen ................. H02K 1/2786
                                                        156/74
(Continued)

FOREIGN PATENT DOCUMENTS

CN    101356711 A    1/2009
JP    58-046857 A    3/1983
(Continued)

OTHER PUBLICATIONS

International Search Report of PCT/JP2011/064460, mailing date Sep. 13, 2011.
(Continued)

*Primary Examiner* — John K Kim
(74) *Attorney, Agent, or Firm* — Westerman, Hattori, Daniels & Adrian, LLP (57) ABSTRACT

A method of resin sealing a permanent magnet in a magnet insertion portion of a laminated body, the body formed by laminating plural core sheets and including the plural portions formed around a shaft hole in a center of the plural portions, the portion connected to an internal space via an opening. The method includes a first process of positioning a blocking member blocking the opening from a side of the space in a way that the member is vertically-placed in a lower die or an upper die, while the both dies hold the body from both sides in an axial direction and close the portion; and a second process of filling a resin extruded from a resin
(Continued)

reservoir portion provided in the die or the die into the portion having the magnet inserted and having the opening closed by the member.

6 Claims, 12 Drawing Sheets

(51) Int. Cl.
*H02K 15/12* (2006.01)
*H02K 1/27* (2006.01)

(58) Field of Classification Search
USPC ..... 29/596, 598; 310/156.08, 156.53, 156.56
IPC .......................................... H02K 15/03,21/14
See application file for complete search history.

(56) References Cited

U.S. PATENT DOCUMENTS

| | | | | |
|---|---|---|---|---|
| 7,653,984 | B2* | 2/2010 | Amano | B29C 45/02 |
| | | | | 264/263 |
| 7,897,089 | B2* | 3/2011 | Matsubayashi | H02K 15/12 |
| | | | | 264/263 |
| 8,922,084 | B2* | 12/2014 | Nagai | H02K 15/03 |
| | | | | 310/114 |
| 2008/0238219 | A1* | 10/2008 | Hoshino | H02K 1/274 |
| | | | | 310/400 |
| 2008/0252166 | A1* | 10/2008 | Shiga | H02K 1/2786 |
| | | | | 310/156.56 |
| 2009/0045689 | A1* | 2/2009 | Haruno | H02K 1/276 |
| | | | | 310/156.56 |
| 2009/0174273 | A1 | 7/2009 | Watanabe et al. | |
| 2009/0189309 | A1 | 7/2009 | Matsubayashi et al. | |
| 2012/0139378 | A1 | 6/2012 | Endo | |
| 2014/0109391 | A1* | 4/2014 | Matsubayashi et al. | 29/596 |

FOREIGN PATENT DOCUMENTS

| | | | |
|---|---|---|---|
| JP | 06-165447 | A | 6/1994 |
| JP | 2002-027712 | A | 1/2002 |
| JP | 2002-034187 | A | 1/2002 |
| JP | 2002-325402 | A | 11/2002 |
| JP | 2004-023976 | A | 1/2004 |
| JP | 2006-197693 | A | 7/2006 |
| JP | 2007-068356 | A | 3/2007 |
| JP | 2008-011646 | A | 1/2008 |
| JP | 2009-131075 | A | 6/2009 |
| JP | 2010-158164 | A | 7/2010 |
| JP | 2010-206882 | A | 9/2010 |
| JP | 2012-044810 | A | 3/2012 |
| WO | 2007/080661 | A1 | 7/2007 |
| WO | WO 2007/080661 | A1 * | 7/2007 ............. H02K 15/03 |
| WO | 2011/077513 | A1 | 6/2011 |

OTHER PUBLICATIONS

Non-Final Office Action dated Oct. 27, 2015 issued in U.S. Appl. No. 14/123,869 (19 pages).
First Notice of Reasons for Refusal dated Jul. 15, 2015, issued in counterpart Chinese Application No. 201280028433.7, with English translation. (15 pages).
Notice of Allowance dated Apr. 25, 2016 issued in U.S. Appl. No. 14/123,869 (9 pages).
Decision of Patent Grant dated Dec. 2, 2014, issued in corresponding Japanese Patent Application No. 2013-218437, with English translation (4 pages).
International Search Report, dated Aug. 7, 2012, issued in corresponding application No. PCT/JP2012/061683.
First Notice of Reasons for Refusal dated Jul. 9, 2014, issued in corresponding Chinese Patent Application No. 201180024896.1 (6 pages).
Notification of Reason for Refusal dated Sep. 2, 2014, issued in corresponding Japanese Patent Application No. 2013-218437 (3 pages).

* cited by examiner

PRIOR ART

FIG. 11(B)

PRIOR ART

FIG. 12(A)

PRIOR ART

FIG. 12(B)

PRIOR ART

METHOD OF RESIN SEALING PERMANENT MAGNET AND LAMINATED CORE MANUFACTURED THEREOF

TECHNICAL FIELD

The present invention relates to a method of resin sealing a permanent magnet and a laminated core manufactured by the method. In the method, the permanent magnet is fixed using resin (by magnet molding) in a laminated body (laminated block) formed by laminating a plurality of core sheets.

BACKGROUND ART

Conventionally, as a method of manufacturing a laminated rotor core by resin sealing a permanent magnet to fix it in a laminated body, a method described in Patent Literature 1 is known, for example. In the method of Patent Literature 1, first, core sheets having a plurality of through-holes formed therein are manufactured by pressing. The core sheets are then laminated and interlocked by a fixing method such as caulking or welding to form the laminated body having a plurality of magnet insertion holes formed by connecting the through-holes. Next, a permanent magnet is inserted in each magnet insertion hole of the laminated body, liquid resin material is injected in a resin injection portion formed between the magnet insertion hole and the inserted permanent magnet, and then the resin material is cured to fix the permanent magnet in the magnet insertion hole. That is how the laminated rotor core is manufactured.

CITATION LIST

Patent Literature

[Patent Literature 1] Japanese Unexamined Patent Application Publication No. 2002-034187

SUMMARY OF INVENTION

Technical Problem

Figure 11A:
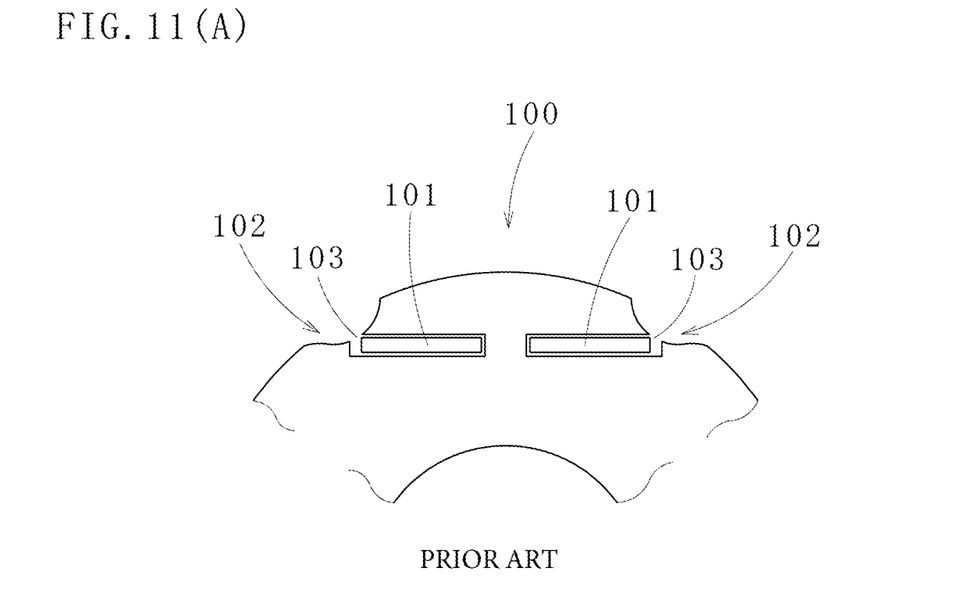
FIG. 11(A) is an explanatory diagram showing a permanent magnet inserted in a magnet insertion hole and FIG. 11(B) is an explanatory diagram showing the permanent magnet inserted and resin-sealed in the magnet insertion hole in a conventional laminated rotor core.
Figure 11B:
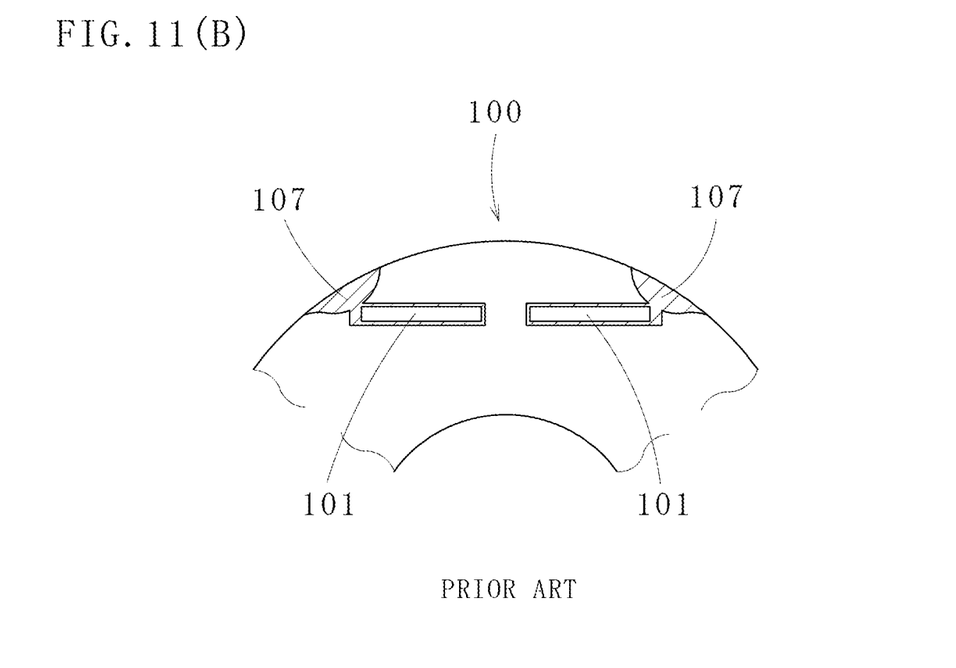

In the method described in Patent Literature 1, it is assumed that the resin injection portion into which resin is injected is an enclosed space. However, as shown in FIG. 11 (A), a magnet insertion hole 102 formed in a laminated rotor core 100, into which a permanent magnet 101 is inserted, is not closed and is connected to an external space via an opening 103. In order to make the magnet insertion hole 102 become an enclosed space, it may be necessary to provide new peripheral equipment such as a blocking member (not shown) in a resin injection-and-sealing device (not shown), which can close the opening 103 formed in the magnet insertion hole 102 by covering the laminated rotor core 100 from outside. Also, in some cases, it may be necessary to change a shape of the laminated rotor core 100. Furthermore, even if the opening 103 of the magnet insertion hole 102 can be closed by the blocking member, a resin 107 has to be filled in an external area of the opening 103 as shown in FIG. 11 (B). Thus, an injection amount of the resin 107 as well as the weight and cost of the laminated rotor core 100 are increased.

Figure 12A:
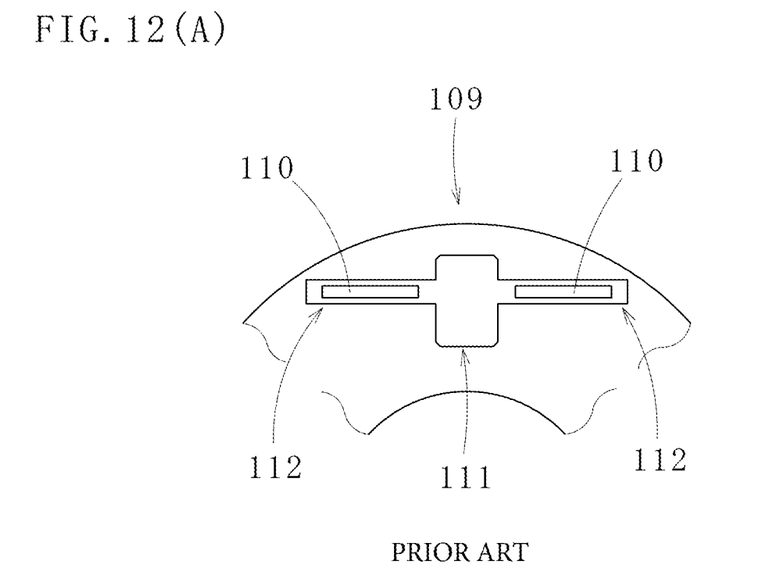
FIG. 12(A) is an explanatory diagram showing a permanent magnet inserted in a magnet insertion hole and FIG. 12(B) is an explanatory diagram showing the permanent magnet inserted and resin-sealed in the magnet insertion hole in a conventional laminated rotor core.
Figure 12B:
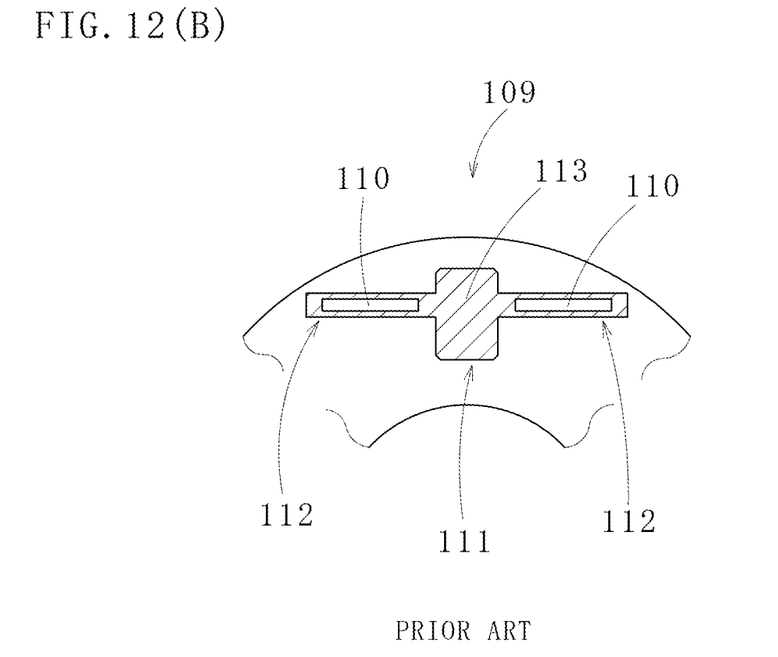

Further, even when a resin injection portion is an enclosed space, if a ratio of a volume of a resin injection portion 112 to a volume of a magnet insertion hole 111 formed in a laminated rotor core 109, into which a permanent magnet 110 is inserted, is large as shown in FIG. 12 (A), a resin has to be filled in a gap (the resin injection portion 112) between the permanent magnet 110 and the magnet insertion hole 111 as shown in FIG. 12 (B). This leads to excess injection of the resin, and thus the weight and cost of the laminated rotor core are increased.

The present invention has been made in view of the above circumstances, and it is an object of the present invention to provide a method of resin sealing a permanent magnet and a laminated core manufactured thereby. In the method, the permanent magnet can be fixed in a laminated body by resin without major modification or introduction of equipment and without resin injection to an unnecessary part.

Solution to Problem

To accomplish the above object, a method of resin sealing a permanent magnet according to a first aspect of the present invention is a method of resin sealing a permanent magnet, the permanent magnet inserted in a magnet insertion portion of a laminated body, the laminated body formed by laminating a plurality of core sheets, the laminated body having a plurality of the magnet insertion portions and internal spaces, the magnet insertion portions formed around a shaft hole in a center of the laminated body, each of the internal spaces connected to the magnet insertion portion via an opening, the method comprising: a first process of positioning a blocking member, the blocking member closing the opening from a side of the internal space in a manner that the blocking member is vertically-placed in one of an upper die and a lower die, the upper die and the lower die holding the laminated body from both sides in an axial direction and blocking the magnet insertion portion; and a second process of filling a resin into the magnet insertion portion having the permanent magnet inside and having the opening blocked by the blocking member, the resin extruded from a resin reservoir portion provided in one of the upper die and the lower die.

A method of resin sealing a permanent magnet according to a second aspect of the present invention is a method of resin sealing a permanent magnet, the permanent magnet inserted in a magnet insertion portion of a laminated body, the laminated body formed by laminating a plurality of core sheets, the laminated body having a plurality of the magnet insertion portions and external spaces, the magnet insertion portions around a shaft hole in a center of the laminated body, each of the external spaces partially exposed to an outside of the laminated body, each of the external spaces connected to the magnet insertion portion via an opening, the method comprising: a first process of positioning a blocking member, the blocking member further closing the opening from a side of the external space in a manner that the blocking member is vertically-placed in one of an upper die and a lower die, the upper die and the lower die holding the laminated body from both sides in an axial direction to and blocking the magnet insertion portion; and a second process of filling a resin into the magnet insertion portion having the permanent magnet inside and having the opening blocked by the blocking member, the resin extruded from a resin reservoir portion provided in one of the upper die and the lower die.

In the method of resin sealing the permanent magnet according to the first and the second aspects of the present invention, it is preferable that the method as defined in one of claims 1 and 2, wherein the blocking member is in contact with or is positioned closely adjacent to the opening when the blocking member closes the opening.

A laminated core according to a third aspect of the present invention is the laminated core manufactured by the method according to the first aspect of the present invention, in which a laminated core manufactured by the method as defined in claim 1, wherein the internal space is formed on one end of the magnet insertion portion, and the resin sealing the permanent magnet in the magnet insertion portion is exposed to the internal space at a position of the opening.

A laminated core according to a fourth aspect of the present invention is the laminated core manufactured by the method according to the second aspect of the present invention, in which a laminated core manufactured by the method as defined in claim 2, wherein the resin sealing the permanent magnet in the magnet insertion portion is exposed to the external space at a position of the opening.

Advantageous Effects of Invention

In the method of resin sealing the permanent magnet according to the first aspect of the present invention, the blocking member closes the opening penetrating the internal space and connecting the magnet insertion portion and the internal space from the side of the internal space, in a manner that the blocking member is vertically placed in one of the upper die and the lower die holding the laminated body from both sides in the axial direction. In the method of resin sealing the permanent magnet according to the second aspect of the present invention, the blocking member closes the opening connecting the magnet insertion portion and the external space from the side of the external space, in a manner that the blocking member is vertically placed in one of the upper die and the lower die holding the laminated body from both sides in the axial direction. Thus, the magnet insertion portion becomes an enclosed space, thereby injection of resin into an unnecessary part can be prevented and an amount of resin used can be reduced. Therefore, a laminated core can be lightweight and a manufacturing cost thereof can be reduced.

Also, since the blocking member can be provided in either the upper die or the lower die of a conventional resin sealing device, it is not necessary to introduce or modify equipment drastically. Thus, increase in equipment cost can be prevented, while time required for resin sealing is reduced and workability (productivity) is improved.

In the method of resin sealing the permanent magnet according to the first and the second aspects of the present invention, if the blocking member is in contact with the opening for closing the opening, the opening is securely closed and required amount of resin can be filled in the resin injection portion formed around the permanent magnet without leakage of resin. Alternatively, if the blocking member is positioned closely adjacent with the opening for closing the opening, abrasive wears of the blocking member and the opening, which may be caused when they are in contact with each other, can be prevented. Further, required amount of resin can be filled in a resin injection portion formed around the permanent magnet while preventing leakage of resin.

In the laminated core according to the third aspect of the present invention, the internal space is formed on one side of the magnet insertion portion, and resin sealing the permanent magnet in the magnet insertion portion is exposed to the internal space at the position of the opening. Thus, injection of resin into the unnecessary part can be prevented and the amount of resin used can be reduced.

Accordingly, the laminated core can be lightweight and the manufacturing cost thereof can be reduced.

In the laminated core according to the fourth aspect of the present invention, resin sealing the permanent magnet in the magnet insertion portion is exposed to the external space at a position of an opening. Thus, injection of resin into the unnecessary part can be prevented and the amount of resin used can be reduced.

Accordingly, the laminated core can be lightweight and the manufacturing cost thereof can be reduced.

DESCRIPTION OF EMBODIMENTS

Referring to the accompanying drawings, embodiments of the present invention will be described for a better understanding of the invention.

Figure 1:
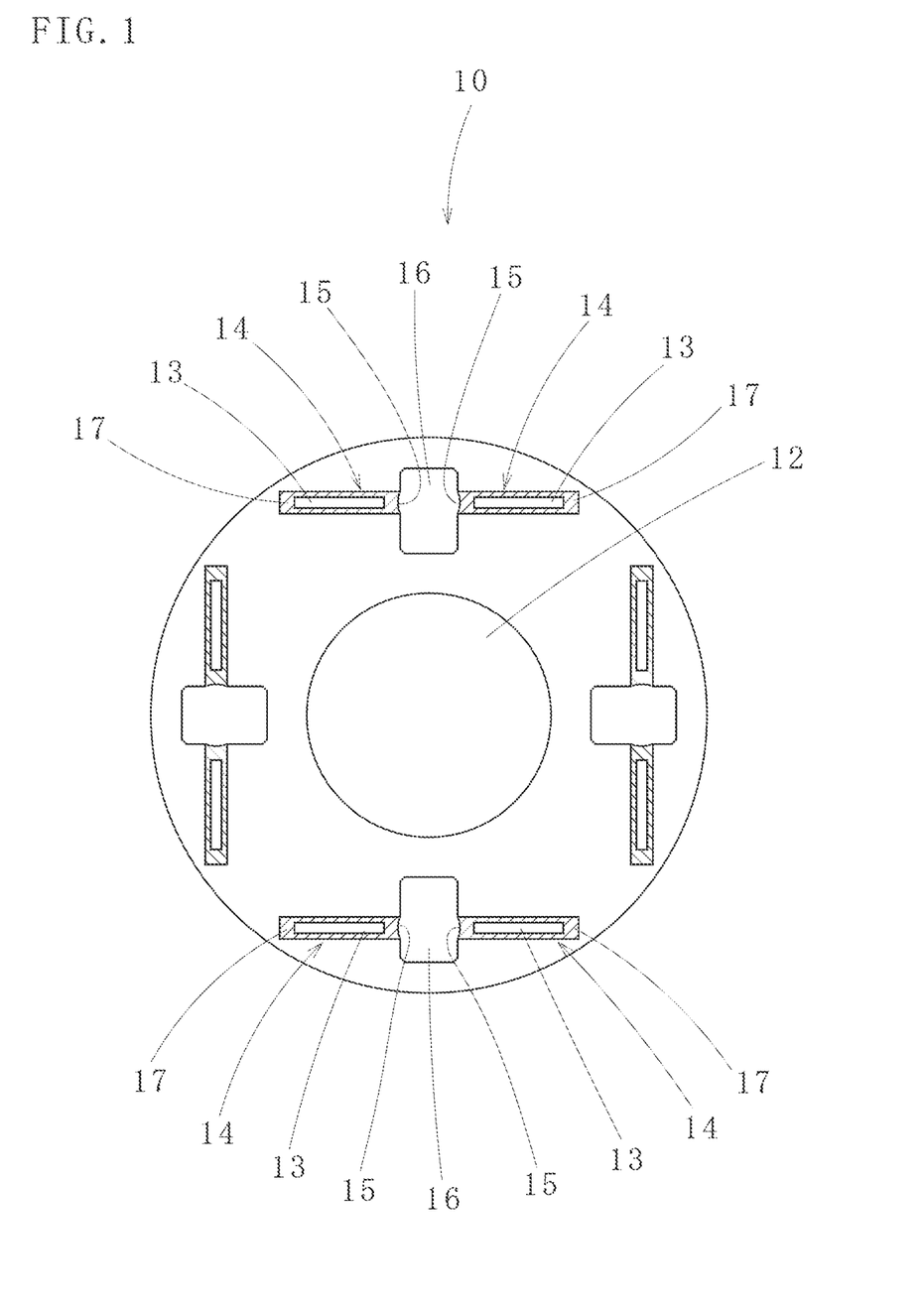
FIG. 1 is a plan view showing a laminated core manufactured by a method of resin sealing a permanent magnet according to a first embodiment of the present invention.
Figure 2:
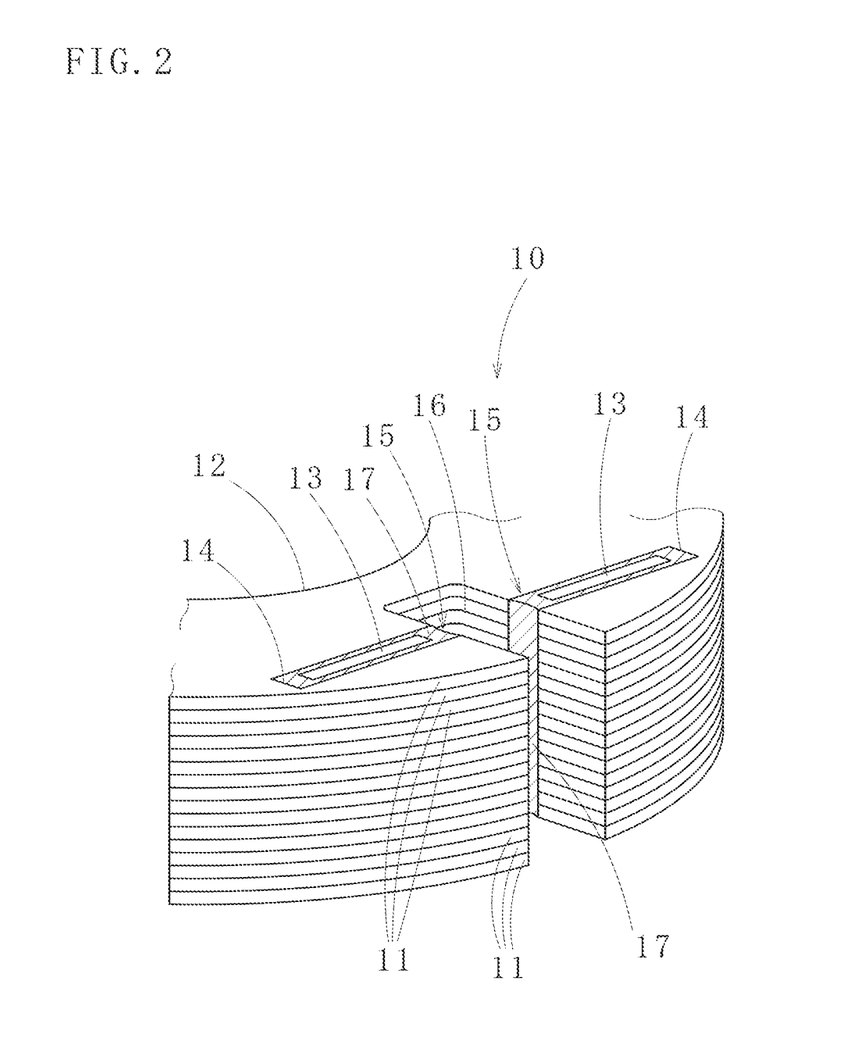
FIG. 2 is a partially cutaway perspective view showing the laminated core manufactured by the method.

As shown in FIGS. 1 and 2, a laminated rotor core 10, which is an example of a laminated core manufactured by a method of resin sealing a permanent magnet according to a first embodiment of the present invention, is formed by laminating a plurality of core sheets 11. The laminated rotor core 10 includes a shaft hole 12 in a center thereof, and a plurality of magnet insertion portions 14, into which permanent magnets 13 are inserted, are formed around the shaft hole 12. On one side of the magnet insertion portion 14, an internal space 16 is formed via an opening 15. A resin 17, which is used to seal the permanent magnet 13 in the magnet insertion portion 14, is exposed to the internal space 16 at a position of the opening 15. By forming the internal space 16 inside the laminated rotor core 10, a weight of the laminated rotor core 10 can be reduced, and a response of the laminated rotor core 10 to rotation and stop can thus be quickened. The internal space 16 helps improve saliency ratio, and reluctance torque can also be enhanced. In addition, the resin 17 used to seal the permanent magnet 13 in the magnet insertion portion 14 is exposed to the internal space 16 at the position of the opening 15. Thus, injection of the resin 17 into the internal space 16 is prevented, and an amount of resin used can be reduced. Therefore, the laminated rotor core 10 can be lightweight and a manufacturing cost thereof can be reduced.

Figure 3:
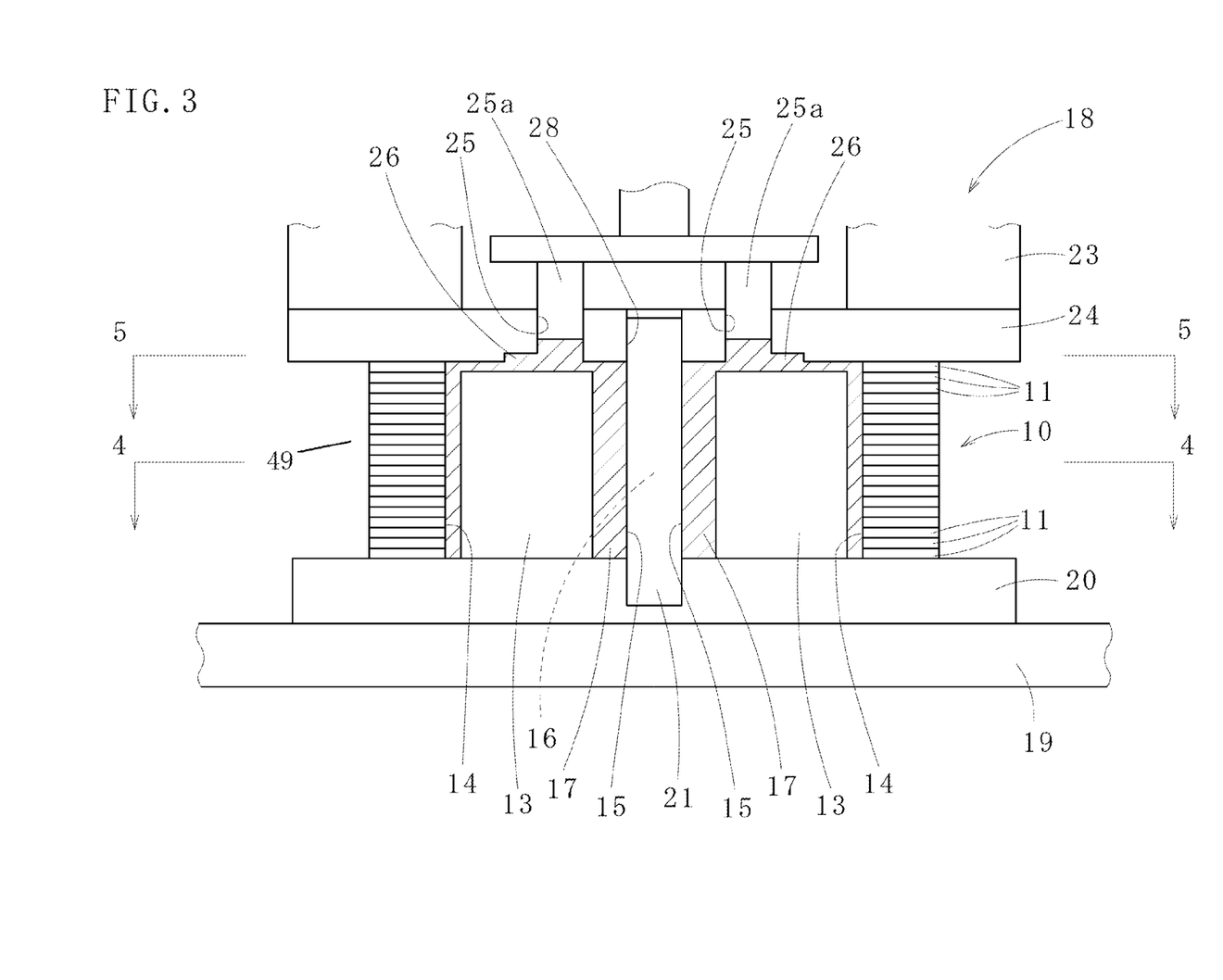
FIG. 3 is a lateral sectional view showing a resin sealing device used in the method.
Figure 4:
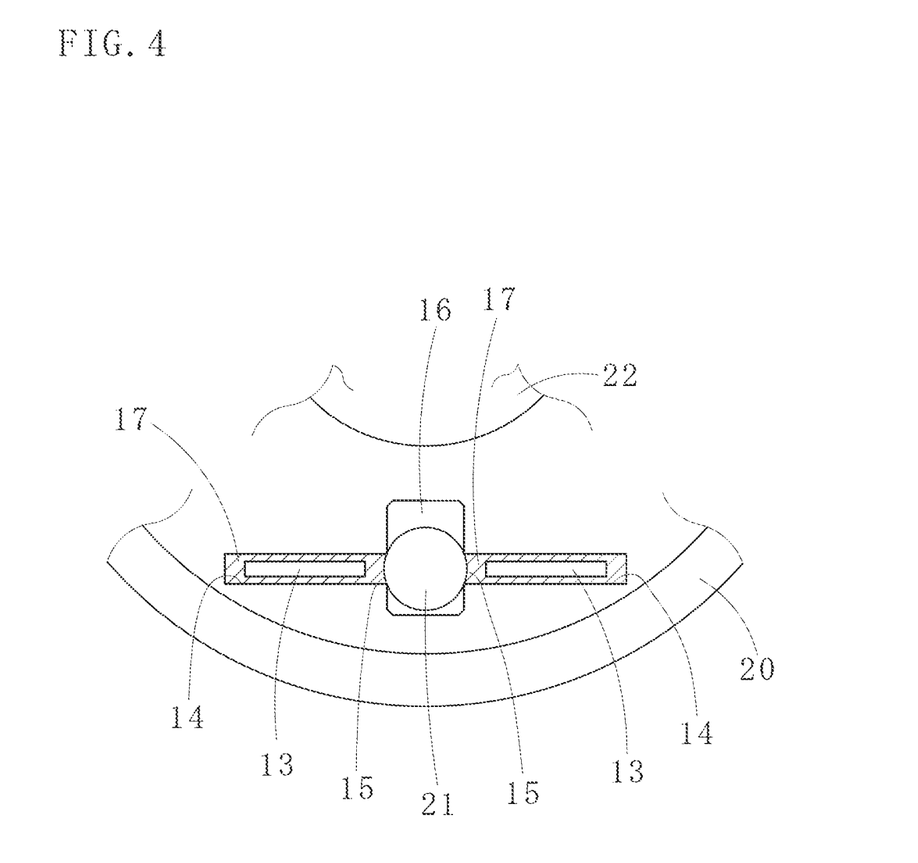
FIG. 4 is a cross-sectional view taken from line 4-4 of FIG. 3.
Figure 5:
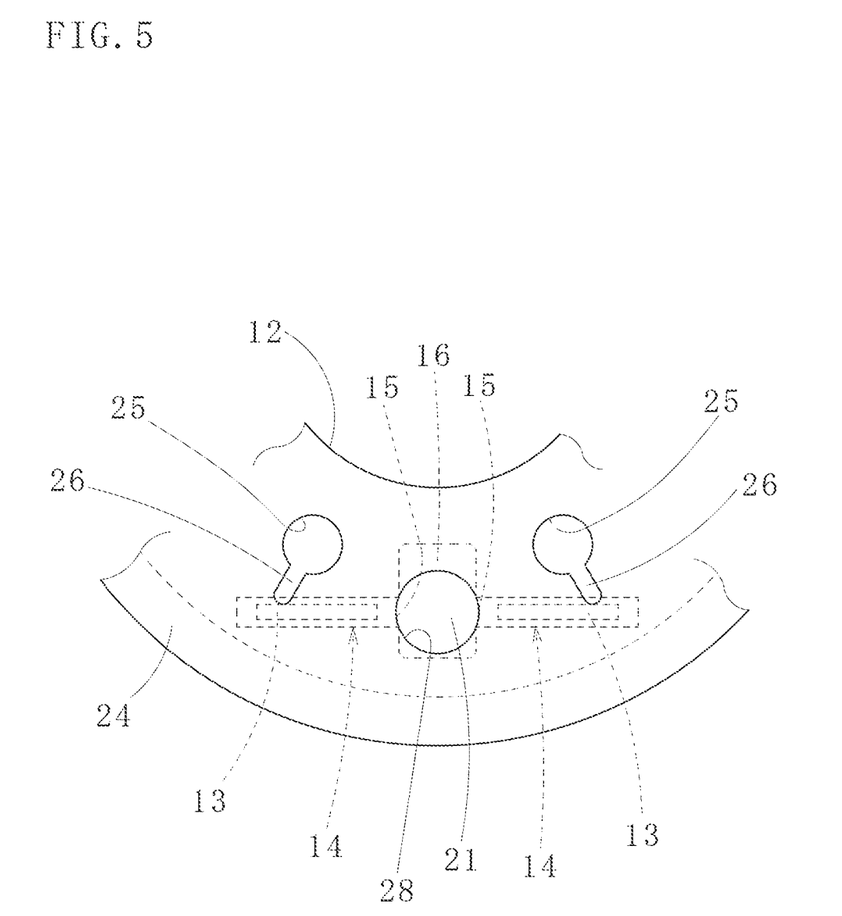
FIG. 5 is a cross-sectional view taken from line 5-5 of FIG. 3.

As shown in FIGS. 3 to 5, a method of resin sealing a permanent magnet according to a first embodiment of the present invention is the method of resin sealing the permanent magnet 13 in the magnet insertion portion 14 formed in a laminated body 49 by using a resin sealing device 18. In this method, the laminated body 49 is formed by laminating a plurality of the core sheets 11 and has a plurality of the magnet insertion portions 14. The magnet insertion portions 14 are formed around the shaft hole 12 in the center of the laminated body 49, and adjacently disposed in pairs. Each pair of the magnet insertion portions 14 includes the internal space 16 therebetween, and the magnet insertion portion 14 is connected to the internal space 16 via the opening 15. The opening is provided on one side of the magnet insertion portion 14 (on the side of the internal space 16). The method according to the first embodiment includes a first process of placing the laminated body 49 on a lower die 20 mounted on an elevating plate 19 provided in the resin sealing device 18; inserting a pin member 21, which is an example of a blocking member provided vertically in the lower die 20, in the internal space 16 of the laminated body 49; and positioning the pin member 21 so as to close the opening 15 from the side of the internal space 16.

Here, a guide shaft 22 is provided in a center of the lower die 20. The guide shaft 22 is inserted in the shaft hole 12 of the laminated body to position the laminated body on the lower die 20 (i.e., to align an axis center of the lower die 20 with an axis center of the laminated body, and to set an angle in a circumferential direction of the laminated body around the axis center of the lower die 20). When the pin member 21 is inserted into the internal space 16, a side of the pin member 21 is in contact with or is positioned closely adjacent with a little gap to the opening 15. Thus, the opening 15 is closed (blocked) by the pin member 21.

Moreover, as shown in FIGS. 3 to 5, the method according to the first embodiment of the present invention includes a second process. The second process includes a first step of inserting the permanent magnet 13 in the magnet insertion portion 14 of the laminated body placed on the lower die 20; a second step of elevating the elevating plate 19 and holding the laminated body between an upper die 24 and the lower die 20 from both sides in an axial direction (a vertical direction), where the upper die 24 is attached to an upper fixing plate (not shown) by a fixing member 23 and the upper fixing plate is mounted in the resin sealing device 18 so as to be above and opposite the elevating plate 19; and a third step of closing the opening 15 by the pin member 21, extruding the resin 17 filled in a resin reservoir portion 25 provided in the upper die 24 by using a plunger 25a into the magnet insertion portion 14 whose top and bottom are respectively blocked by the upper die 24 and the lower die 20, and thereby filling the resin 17 into the magnet insertion portion 14 (i.e., a gap between the permanent magnet 13 and the magnet insertion portion 14) via a resin passage 26. Here, a projection length of the pin member 21 provided vertically in the lower die 20 (i.e., a length of the pin member 21 projecting from the lower die 20) is larger than a maximum thickness of lamination of the laminated body. Also, a top end of the pin member 21 closing the opening 15 is inserted in an engagement portion (through-hole) 28, which is formed in the upper die 24 by penetrating the upper die 24.

Figure 6:
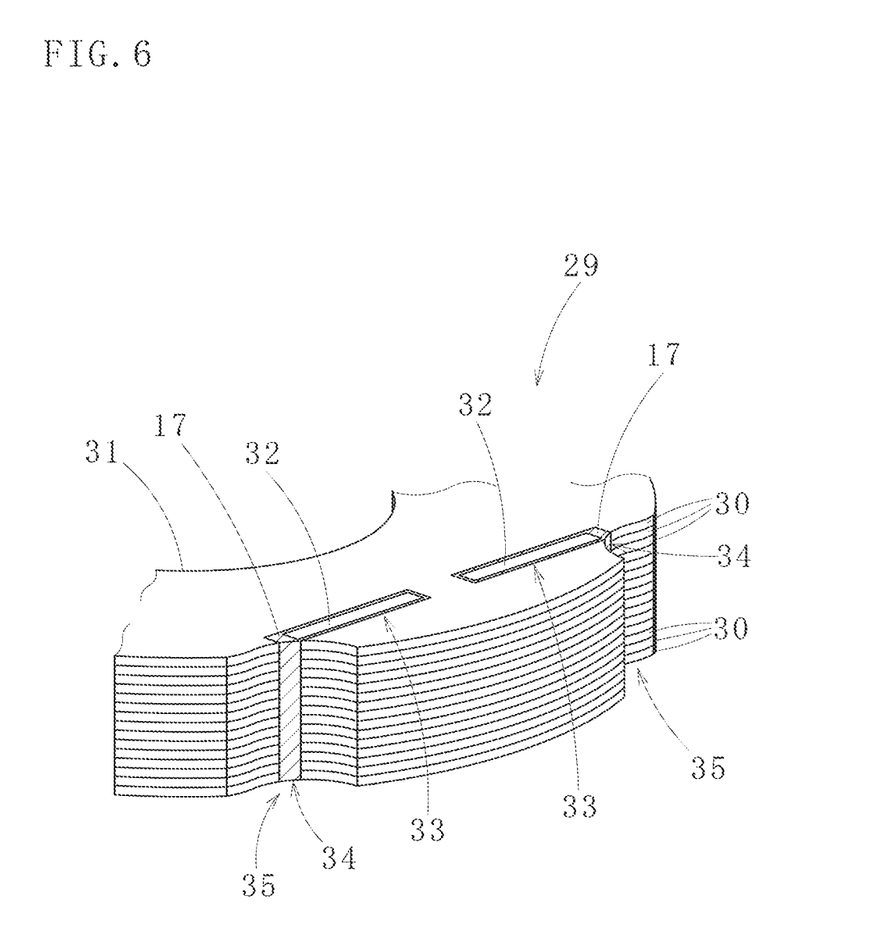
FIG. 6 is a partially cutaway perspective view showing a laminated core manufactured by a method of resin sealing a permanent magnet according to a second embodiment of the present invention.
Figure 7:
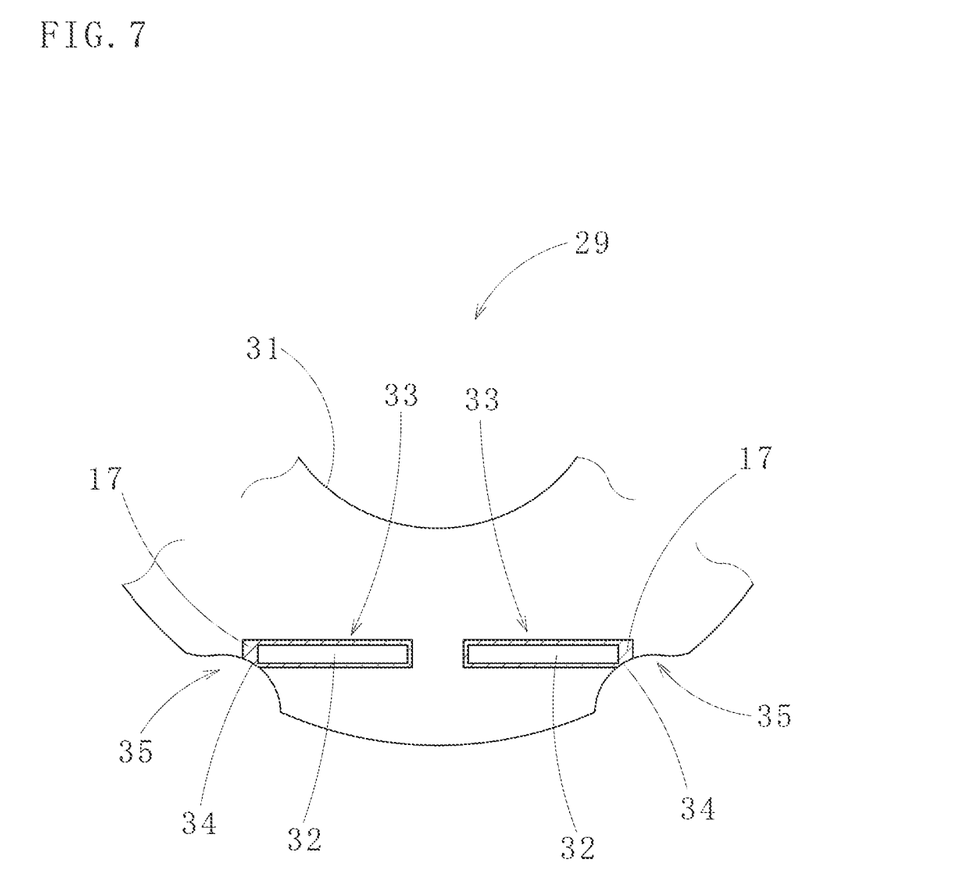
FIG. 7 is a partial plan view showing the laminated core manufactured by the method.

As shown in FIGS. 6 and 7, a laminated rotor core 29, which is an example of a laminated core manufactured by a method of resin sealing a permanent magnet according to a second embodiment of the present invention, is formed by laminating a plurality of core sheets 30. The laminated rotor core 29 includes a shaft hole 31 in a center thereof, and a plurality of magnet insertion portions 33, into which permanent magnets 32 are inserted, are formed around the shaft hole 31. The magnet insertion portion 33 is connected to an external space 35, and a part of the external space 35 is exposed to an outside via an opening 34. The resin 17 used to seal the permanent magnet 32 into the magnet insertion portion 33 is exposed to the external space 35 at a position of the opening 34. By forming the external space 35 on an outer circumference of the laminated rotor core 29, a weight of the laminated rotor core 29 can be reduced, and a response of the laminated rotor core 29 to rotation and stop can thus be quickened. The external space 35 helps improve saliency ratio, and reluctance torque can also be enhanced. In addition, the resin 17 used to seal the permanent magnet 32 in the magnet insertion portion 33 is exposed to the external space 35 at the position of the opening 34. Thus, injection of the resin 17 into the external space 35 is prevented, and an amount of resin used can be reduced. Therefore, the laminated rotor core 29 can be lightweight and a manufacturing cost thereof can be reduced.

Figure 8:
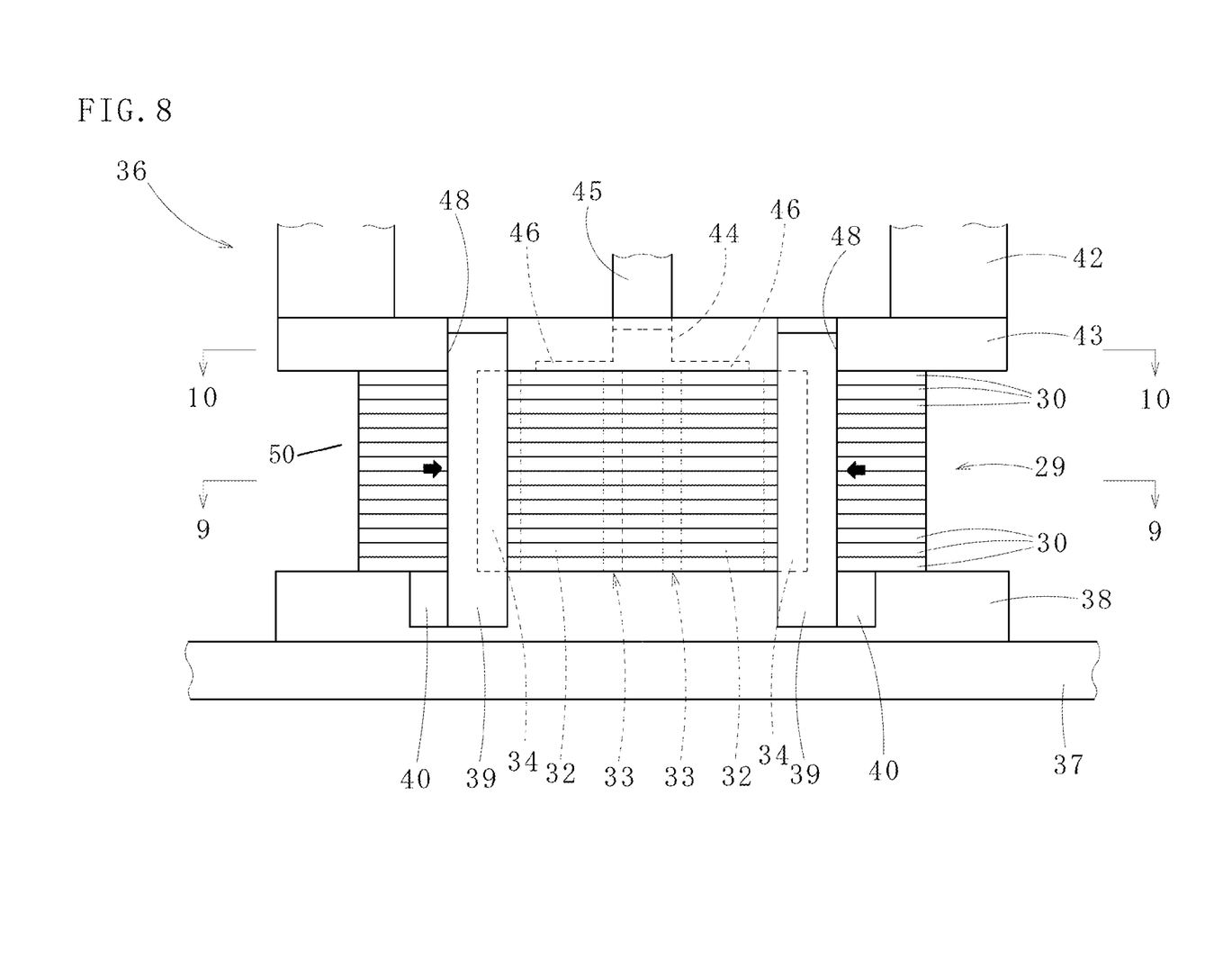
FIG. 8 is a lateral sectional view showing a resin sealing device used in the method.
Figure 9:
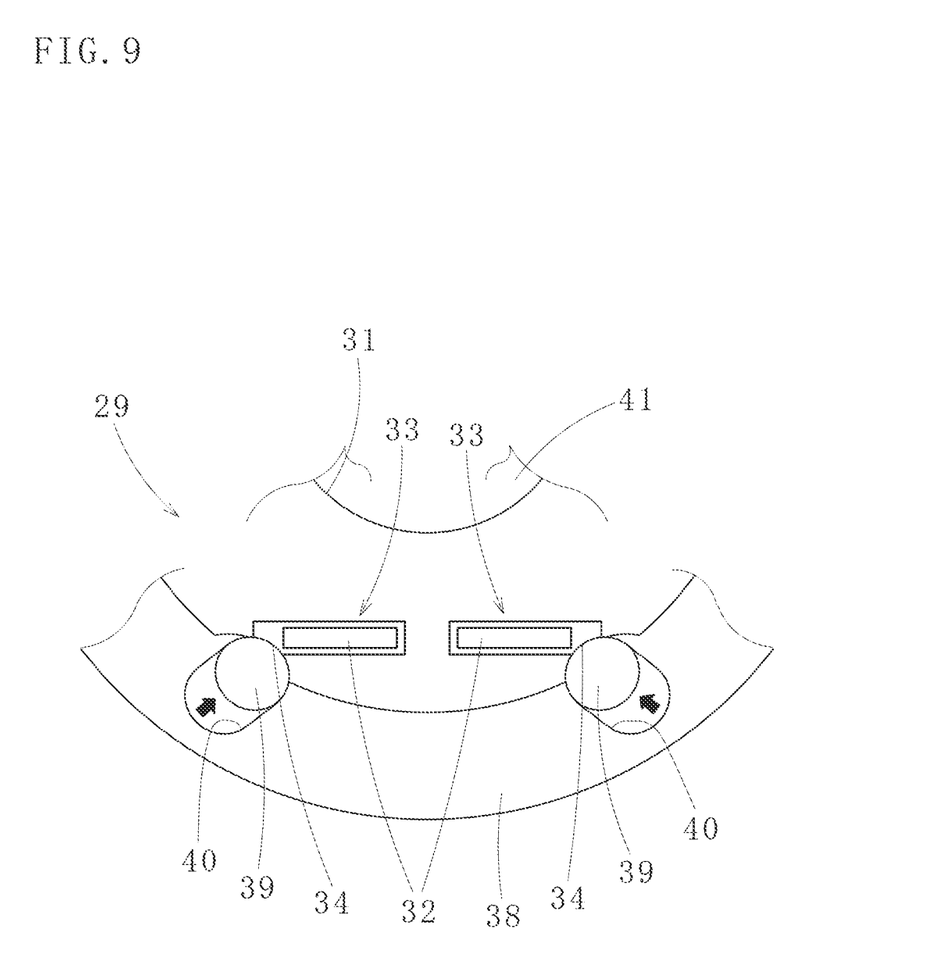
FIG. 9 is a cross-sectional view taken from line 9-9 of FIG. 8.
Figure 10:
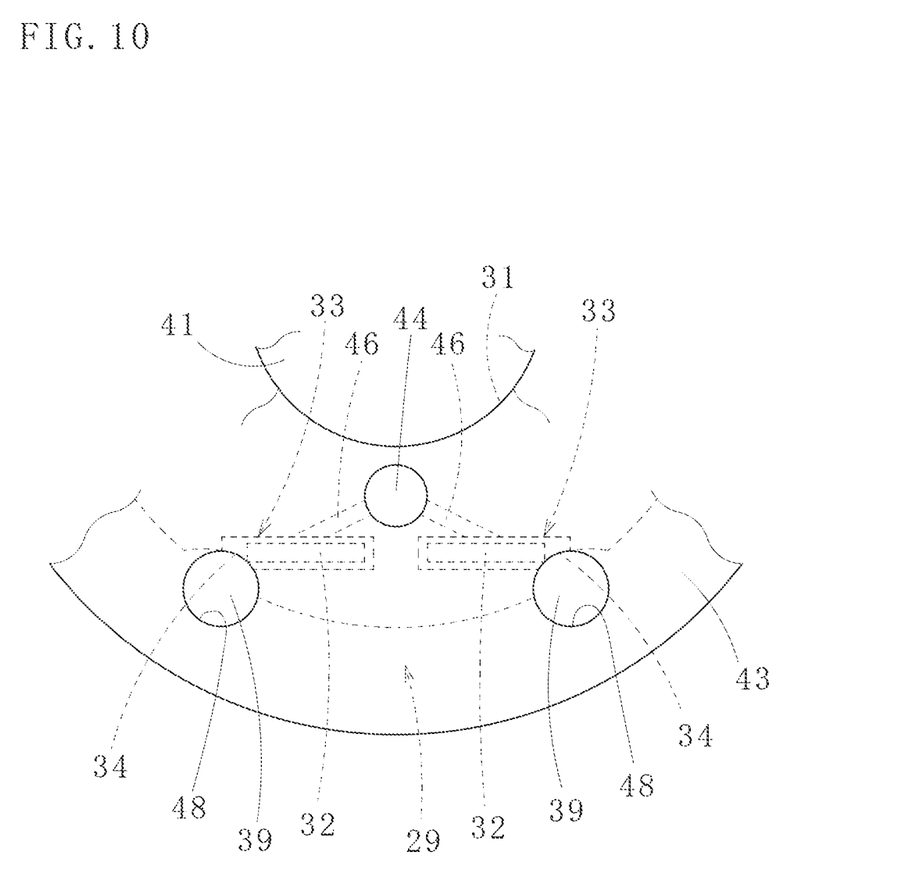
FIG. 10 is a cross-sectional view taken from line 10-10 of FIG. 8.

As shown in FIGS. 8 to 10, a method of resin sealing a permanent magnet according to a second embodiment of the present invention is the method of resin sealing the permanent magnet 32 in the magnet insertion portion 33 formed in a laminated body 50 by using a resin sealing device 36. In this method, the laminated body 50 is formed by laminating a plurality of the core sheets 30 and has a plurality of the magnet insertion portions 33. The magnet insertion portions 33 are formed around the shaft hole 31 in the center of the laminated body 50. Here, the opening 34 is provided on one side of the magnet insertion portion 33 (on an outer circumference of the laminated body 50), and the magnet insertion portion 33 is connected via the opening 34 to the external space 35. The external space 35 is provided on the outer circumference of the laminated body 50 and is open to an outside of the laminated body 50. The method according to the second embodiment of the present invention includes a first process of placing the laminated body 50 on a lower die 38 mounted on an elevating plate 37 provided in the resin sealing device 36; moving a pin member 39, which is an example of a blocking member provided vertically with a gap on an outside of the external space 35 of the laminated body 50, through a guide portion 40 made of a long hole formed in the lower die 38 by using a drive mechanism (not shown); and positioning the pin member 39 so as to close the opening 34 from the side of the external space 35.

Here, a guide shaft 41 is provided in a center of the lower die 38. The guide shaft 41 is inserted in the shaft hole 31 of the laminated body to position the laminated body on the lower die 38 (i.e., to align an axis center of the lower die 38 with an axis center of the laminated body, and to set an angle in a circumferential direction of the laminated body around the axis center of the lower die 38). When the pin member 39 moves in the guide member 40, a side of the pin member 39 is in contact with or is positioned closely adjacent with a little gap to the opening 34. Thus, the opening 34 is closed (blocked) by the pin member 39.

Moreover, as shown in FIGS. 8 to 10, the method according to the second embodiment of the present invention includes a second process. The second process includes a first step of inserting the permanent magnet 32 in the magnet insertion portion 33 of the laminated body placed on the lower die 38; a second step of elevating the elevating plate 37 and holding the laminated body between an upper die 43 and the lower die 38 from both sides in an axial direction (a vertical direction), where the upper die 43 is attached to an upper fixing plate (not shown) by a fixing member 42 and the upper fixing plate is mounted in the resin sealing device 36 so as to be above and opposite the elevating plate 37; and a third step of closing the opening 34 by the pin member 39, extruding the resin 17 filled in a resin reservoir portion 44 provided in the upper die 43 by using a plunger 45 into the magnet insertion portion 33 whose top and bottom are respectively blocked by the upper die 43 and the lower die 38; and thereby filling the resin 17 into the magnet insertion portion 33 (i.e., a gap between the permanent magnet 32 and the magnet insertion portion 33) via a resin passage 46.

Here, a projection length of the pin member 39 provided vertically in the lower die 38 (i.e., a length of the pin member 39 projecting from the lower die 38) is larger than a maximum thickness of lamination of the laminated body. Also, a top end of the pin member 39 closing (blocking) the opening 34 is inserted in an engagement portion (through-hole) 48, which is formed in the upper die 43 by penetrating the upper die 43.

Although the present invention is described above by referring to the embodiments, the present invention is not limited to the configurations of the above-described embodiments, and other embodiments and modifications may be made without departing from the scope of claims of the present invention.

For instance, in the first and second embodiments, the blocking member (pin member) is vertically-placed in the lower die, but the blocking member can be vertically-placed in the upper die. Also, the blocking member does not have to be vertically-placed directly in the upper die or the lower die, but the blocking member may be movable. In such case, the blocking member is built into the resin sealing device in advance and sticks out only during the resin sealing so that the blocking member is vertically-placed in the upper die or the lower die. In addition, the resin reservoir portion may be provided in the lower die. Further, a projection length of the blocking member (pin member) may be equal to a maximum thickness of lamination of the laminated body.

INDUSTRIAL APPLICABILITY

The present invention enables weight reduction of a laminated rotor core, thus a motor with lighter weight and faster response can be provided. The motor may be used for an automobile, and may also be used as an industrial or a consumer motor for providing a device more energy-saving and with faster response than a conventional device.

REFERENCE SIGNS LIST

10: laminated rotor core, 11: core sheet, 12: shaft hole, 13: permanent magnet, 14: magnet insertion portion, 15: opening, 16: internal space, 17: resin, 18: resin sealing device, 19: elevating plate, 20: lower die, 21: pin member, 22: guide shaft, 23: fixing member, 24: upper die, 25: resin reservoir portion, 25a: plunger, 26: resin passage, 28: engagement portion, 29: laminated rotor core, 30: core sheet, 31: shaft hole, 32: permanent magnet, 33: magnet insertion portion, 34: opening, 35: external space, 36: resin sealing device, 37: elevating plate, 38: lower die, 39: pin member, 40: guide portion, 41: guide shaft, 42: fixing portion, 43: upper die, 44: resin reservoir portion, 45: plunger, 46: resin passage, 48: engagement portion

We claim:

1. A method of resin sealing permanent magnets, the permanent magnets inserted in a plurality of magnet insertion portions of a laminated body, the laminated body formed by laminating a plurality of core sheets, the laminated body having the plurality of the magnet insertion portions and internal spaces, the magnet insertion portions formed around a shaft hole in a center of the laminated body, the internal spaces connected to the magnet insertion portions via openings, the method comprising:

a first process of positioning a blocking member inside each of the internal spaces, the blocking member closing the openings to the magnet insert portions in a manner that the blocking member is vertically-placed in one of an upper die and a lower die, the upper die and the lower die holding the laminated body from both sides in an axial direction, and blocking the magnet insertion portions to form blocked magnet insertion portions; and a second process of filling a resin into the blocked magnet insertion portions, the resin extruded from a resin reservoir portion provided in one of the upper die and the lower die;

wherein the internal spaces are formed inside the laminated body, the magnet insertion portions are open areas where both the permanent magnets and the resin occupy, and the openings are open spaces at the boundary between the magnet insertion portions and the internal spaces.

2. A laminated core manufactured by the method as defined in claim 1, wherein each of the internal spaces is formed on one end of each of the magnet insertion portions, and the resin in the blocked magnet insertion portions is exposed to the internal spaces at the openings.

3. The method as defined in claim 1, wherein the blocking member is in contact with or is positioned closely adjacent to the openings wherein the blocking member closes the openings.

4. A method of resin sealing permanent magnets, the permanent magnets inserted in a plurality of magnet insertion portions of a laminated body, the laminated body formed by laminating a plurality of core sheets, the laminated body having the plurality of the magnet insertion portions and external spaces, the magnet insertion portions around a shaft hole in a center of the laminated body, each of the external spaces partially exposed to an outside of the laminated body, each of the external spaces connected to a magnet insertion portion via an opening, the method comprising:

a first process of positioning a blocking member inside each of the external spaces, the blocking member further closing the opening to the magnet insert portion in a manner that the blocking member is vertically-placed in one of an upper die and a lower die, the upper die and the lower die holding the laminated body from both sides in an axial direction, and blocking the magnet insertion portion to form a blocked magnet insertion portion; and a second process of filling a resin into the blocked magnet insertion portion, the resin extruded from a resin reservoir portion provided in one of the upper die and the lower die;

wherein the external spaces are formed on an outer circumference of the laminated body, the magnet insertion portions are open areas where both the permanent magnets and the resin occupy, and the openings are open spaces at the boundary between the magnet insertion portions and the internal spaces.

5. A laminated core manufactured by the method as defined in claim 4, wherein the resin in the blocked magnet insertion portion is exposed to one of the external spaces at the opening.

6. The method as defined in claim 4, wherein the blocking member is in contact with or is positioned closely adjacent to the opening wherein the blocking member closes the opening.

* * * * *